United States Patent

Saita et al.

(10) Patent No.: US 12,227,100 B2
(45) Date of Patent: Feb. 18, 2025

(54) CHARGING CONTROL METHOD FOR ELECTRIC MOVING BODY, AND ELECTRIC MOVING BODY

(71) Applicant: HONDA MOTOR CO., LTD., Tokyo (JP)

(72) Inventors: Akira Saita, Tokyo (JP); Shoyen Chang, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 411 days.

(21) Appl. No.: 17/677,954

(22) Filed: Feb. 22, 2022

(65) Prior Publication Data

US 2022/0289056 A1    Sep. 15, 2022

(30) Foreign Application Priority Data

Mar. 11, 2021    (JP) .................................. 2021-039509

(51) Int. Cl.
*B60L 53/00*    (2019.01)
*B60L 53/30*    (2019.01)
(Continued)

(52) U.S. Cl.
CPC ............. *B60L 53/62* (2019.02); *B60L 53/305* (2019.02); *B60L 58/12* (2019.02)

(58) Field of Classification Search
CPC ........ B60L 53/62; B60L 53/305; B60L 58/12; B60L 53/00; B60L 2250/16;
(Continued)

(56) References Cited

U.S. PATENT DOCUMENTS

2010/0164439 A1    7/2010  Ido
2012/0256588 A1*  10/2012  Hayashi .................... B60L 3/12
                                                                320/109
(Continued)

FOREIGN PATENT DOCUMENTS

JP    2001-008380 A    1/2001
JP    2010-154646 A    7/2010
(Continued)

OTHER PUBLICATIONS

Office Action dated Sep. 6, 2022 issued over the corresponding Japanese Patent Application No. 2021-039509 with the English translation thereof.

*Primary Examiner* — Ian Jen
*Assistant Examiner* — Hossam M Abd El Latif
(74) *Attorney, Agent, or Firm* — Carrier, Shende & Associates P.C.; Joseph P. Carrier; Jeffrey T. Gedeon

(57) ABSTRACT

A battery consumption amount from when an electric vehicle departs a base charging location to when the electric moving body has returned to the base charging location is set as a consumption amount of one day, and an estimated consumption amount of one day is calculated based on the consumption amounts of the past n days. A value obtained by adding the estimated consumption amount and a margin to a lower limit remaining capacity determined in advance by a user is set as a charging recommendation threshold value. When the remaining capacity of the battery drops below the charging recommendation threshold value, a notification prompting charging of the battery is transmitted to an on-board HMI of the electric moving body or a terminal of the user.

9 Claims, 14 Drawing Sheets

(51) Int. Cl.
*B60L 53/62* (2019.01)
*B60L 53/66* (2019.01)
*B60L 58/12* (2019.01)

(58) Field of Classification Search
CPC .............. B60L 2260/54; B60L 53/665; B60L 2260/44; Y02T 10/70; Y02T 10/7072
USPC .......................................................... 701/22
See application file for complete search history.

(56) References Cited

U.S. PATENT DOCUMENTS

| | | | |
|---|---|---|---|
| 2015/0239455 A1* | 8/2015 | Qiu ................... | B60W 50/0097 701/22 |
| 2020/0055420 A1* | 2/2020 | Peer ........................ | B60L 53/62 |
| 2020/0171970 A1* | 6/2020 | Lee ........................... | B60L 7/10 |
| 2020/0269835 A1* | 8/2020 | Hara ....................... | H04W 4/48 |
| 2020/0341073 A1* | 10/2020 | Tang ................... | G01R 31/3842 |
| 2023/0303056 A1* | 9/2023 | Hu ..................... | B60W 50/0097 |
| 2024/0083301 A1* | 3/2024 | Mankowski ............ | B60L 58/12 |

FOREIGN PATENT DOCUMENTS

| | | |
|---|---|---|
| JP | 2011-169663 A | 9/2011 |
| JP | 2012-228165 A | 11/2012 |
| JP | 2017-041952 A | 2/2017 |
| JP | 2020-202724 A | 12/2020 |

\* cited by examiner

CHARGING CONTROL METHOD FOR ELECTRIC MOVING BODY, AND ELECTRIC MOVING BODY

CROSS-REFERENCE TO RELATED APPLICATIONS

This application is based upon and claims the benefit of priority from Japanese Patent Application No. 2021-039509 filed on Mar. 11, 2021, the contents of which are incorporated herein by reference.

BACKGROUND OF THE INVENTION

Field of the Invention

The present invention relates to a charging control method for an electric moving body, such as a vehicle, ship, boat, airplane, or unmanned flying body, which moves using a battery loaded therein as a power source, and also to an electric moving body.

Description of the Related Art

As an example, JP 2012-228165 A describes checking the current SOC of a battery when a charging apparatus is connected to an electric automobile after one day of usage of the electric automobile has ended. JP 2012-228165 A (paragraph 0047) also describes judging whether the current SOC would cause a problem in travel according to a usage pattern (consumption amount) of the following day, based on the day of the week of the following day.

JP 2012-228165 A describes that, if it is judged that the current SOC would cause a problem in travel according to the usage pattern of the following day and charging becomes necessary, charging is performed up to a target SOC. The target SOC is set to an SOC (target SOC=current SOC before charging+charging amount of this instance) that satisfies the usage pattern (consumption amount) of the following day while avoiding full charging and significantly reducing the number of times charging is performed, in order to prevent battery deterioration (paragraphs 0047, 0048, and 0055 of JP 2012-228165 A).

JP 2011-169663 A (paragraph 0007) describes a remaining battery amount warning apparatus of an electric automobile that, when the remaining electricity amount has decreased to a prescribed electricity amount necessary for travel from the parking location of the electric automobile to a specified charging facility, transmits a warning signal to a prescribed communication terminal.

SUMMARY OF THE INVENTION

According to the conventional art above, it is envisioned that notification is provided when the remaining capacity of the battery has decreased to a prescribed remaining capacity, and a charging amount is set in accordance with the consumption amount of the user on the following day when charging is necessary.

However, each user feels a different degree of worry about an electricity shortage occurring due to the decrease of the remaining capacity of the battery. There is no mention of this point in the conventional art.

In other words, there is a concern that even though notification is received when the remaining electricity amount (referred to below as the remaining capacity of the battery, the battery remaining capacity, or the remaining capacity) has decreased to the prescribed remaining capacity necessary for travel from the parking location of the vehicle to the specified charging facility, a user will still feel worried about an electricity shortage.

If worry about an electricity shortage is felt (experienced), the user checks the remaining battery amount display daily and understands the trend of the consumption amount resulting from the usage by the user themselves, from the day by day decrease amount in the remaining battery amount display.

Then, while understanding the trend of the consumption amount, it is necessary to judge that it would be good to perform charging soon, taking into account a certain margin for the remaining battery amount according to the upcoming scheduled travel distance.

In this way, there is a psychological burden of having to check the remaining battery amount every day placed on a user who is worried about an electricity shortage.

Furthermore, when a user experiences worry about an electricity shortage, the user performs charging at an earlier timing despite the remaining capacity of the battery still being sufficient, in order to avoid a decrease in the remaining capacity of the battery. In such a case, the number of times charging is performed (charging frequency) is increased beyond what is necessary, and there is a concern that the user will feel irritated.

In contrast to this, if charging with a necessary charging amount that will be consumed by using the vehicle during a prescribed period is performed with a single charging, charging is performed earlier even though the remaining capacity of the battery is still sufficient, which results in the battery being charged to a higher SOC.

In such a case, the frequency of the battery being left in a high SOC state increases beyond what is necessary. As is widely known, a battery experiences greater deterioration as the time during which the battery is left in a state near full charge (high SOC state) increases, and as a result, there is a concern that the deterioration of the battery will progress.

Furthermore, if charging is performed in accordance with the prescribed electricity amount necessary for the usage pattern of the following day or for travel from the parking location of the vehicle to the specified charging facility, there are cases where it is necessary to perform charging again due to a slight change of plans, and this is inconvenient for the user.

The present invention has been devised taking into consideration the aforementioned problem, and has an object of providing a charging control method for an electric moving body, as well as an electric moving body, which make it possible to eliminate worry felt by a user about an electric shortage and to restrict deterioration of a battery by significantly reducing the number of times charging is performed (charging frequency).

A charging control method for an electric moving body according to one aspect of the present invention is a charging control method for an electric moving body that moves using a battery as a power source, the charging control method comprising: setting, as a consumption amount of one day, a battery consumption amount from when the electric moving body departs a base charging location to when the electric moving body has returned to the base charging location, and calculating an estimated consumption amount of one day based on the consumption amounts of past n days; setting, as a charging recommendation threshold value, a value obtained by adding the estimated consumption amount and a margin to a lower limit remaining capacity determined in advance; and transmitting a notification prompting charging of the battery to an on-board human machine interface of the electric moving body or a terminal of a user when a remaining capacity of the battery drops below the charging recommendation threshold value.

An electric moving body according to another aspect of the present invention is an electric moving body that moves using a battery as a power source and comprises a charging control apparatus including a memory that stores instructions, and a CPU that reads and executes the instructions from the memory, wherein the CPU executes the instructions to cause the charging control apparatus to: set, as a consumption amount of one day, a battery consumption amount from when the electric moving body departs a base charging location to when the electric moving body has returned to the base charging location, and calculate an estimated consumption amount of one day based on the consumption amounts of past n days; set, as a charging recommendation threshold value, a value obtained by adding the estimated consumption amount and a margin to a lower limit remaining capacity determined in advance; and transmit a notification prompting charging of the battery to an on-board human machine interface of the electric moving body or a terminal of a user when a remaining capacity of the battery drops below the charging recommendation threshold value.

According to the present invention, the charging recommendation threshold value is set to be a value obtained by adding, to the lower limit remaining capacity determined in advance, the margin and the estimated consumption amount calculated in advance based on the consumption amounts of a plurality of past days. As a result, the notification prompting charging (charging recommendation notification) is provided at a suitable timing when the remaining capacity has not dropped below the lower limit remaining capacity during vehicle usage, and by performing charging in advance in accordance with this charging recommendation notification, worry about an electricity shortage is eliminated. Furthermore, since the charging recommendation threshold value is limited to the necessary minimum that includes the margin, the number of times charging is performed (charging frequency) is significantly reduced and battery deterioration is restricted. Therefore, it is possible to improve convenience for the user.

The above and other objects, features, and advantages of the present invention will become more apparent from the following description when taken in conjunction with the accompanying drawings, in which a preferred embodiment of the present invention is shown by way of illustrative example.

DESCRIPTION OF THE INVENTION

Preferred embodiments of a charging control method for an electric moving body and an electric moving body according to the present invention will be presented and described in detail below with reference to the accompanying drawings.

[Configuration]

Figure 1:
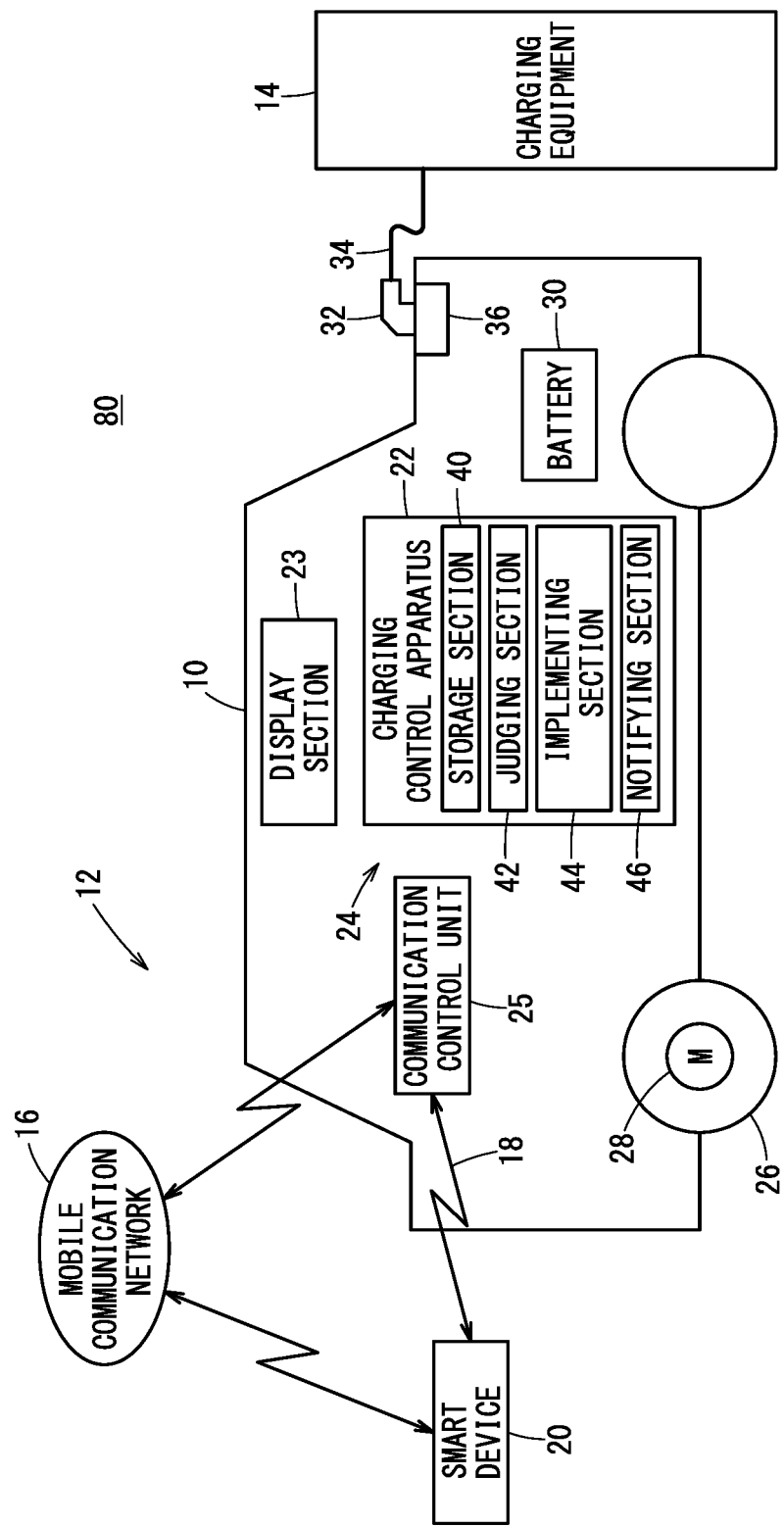
FIG. 1 is a system diagram showing a configurational example of a system including an electric vehicle serving as an electric moving body according to an embodiment implementing a charging control method for an electric moving body according to the embodiment.

FIG. 1 is a system diagram showing a configurational example of a system 12 including an electric vehicle (here, an electric automobile) 10 serving as the electric moving body according to an embodiment implementing the charging control method for an electric moving body according to the present embodiment.

The system 12 is formed by, in addition to the electric vehicle 10, charging equipment 14 that supplies power to the electric vehicle 10 from the outside, and a smart device 20. The smart device 20 is a smartphone or the like capable of communicating with the electric vehicle 10 via a communication network 16 such as a mobile communication network or short-range wireless communication 18 such as Bluetooth®. The communication network 16 may include the Internet.

The smart device 20 is a terminal carried by a user, who is a driver or the like of the electric vehicle 10.

The electric vehicle 10 includes a navigation apparatus 24, in which a charging control apparatus 22 is mounted, and a battery 30 that supplies power to an electric motor 28 that rotationally drives wheels 26 of the electric vehicle 10.

The navigation apparatus 24 is an on-board human machine interface (HMI) that exchanges information between the user (or the smart device 20 operated by the user) and the electric vehicle 10 (charging control apparatus 22). The on-board HMI is not limited to being the navigation apparatus 24, and may be a display audio apparatus or the like.

The battery 30 is a high-capacity lithium-ion battery. The electric vehicle 10 can ensure a cruising distance of approximately 500 [km] with a single charge. The present invention is also capable of being applied to a moving body such as an electric vehicle that has a cruising distance shorter or longer than 500 [km].

In this electric vehicle 10, the charging control apparatus 22 is mounted in the navigation apparatus 24. All constituent elements of the charging control apparatus 22, or constituent elements other than an implementing section 44, can be provided independently of the navigation apparatus 24, for example, in a management server 82 (FIG. 14) described further below.

Returning to FIG. 1, the navigation apparatus 24 includes the charging control apparatus 22, a display section (on-board display) 23, and a communication control unit 25.

Figure 2:
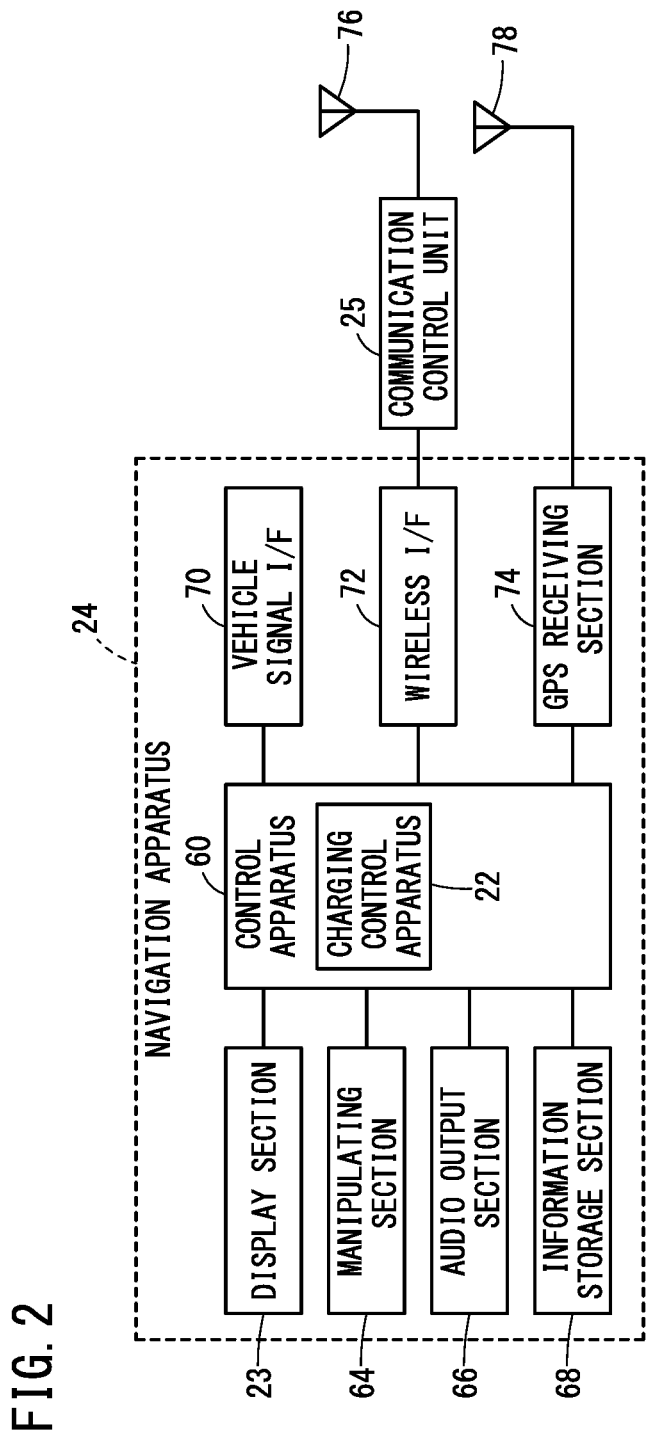
FIG. 2 is a block diagram showing a detailed configurational example of a navigation apparatus.

FIG. 2 is a block diagram showing a detailed configurational example of the navigation apparatus 24.

As shown in FIG. 2, the navigation apparatus 24 includes a control apparatus 60 in which the charging control apparatus 22 is mounted. The navigation apparatus 24 includes the display section (display) 23, a manipulating section 64, an audio output section (speaker) 66, an information storage section 68, a vehicle signal I/F 70, a wireless I/F 72, and a GPS receiving section (satellite positioning apparatus) 74, which transmit and receive various signals including a control signal to and from the control apparatus 60.

The display section 23 displays a map, a current location, and a recommended route from the current location to a destination, based on data from the control apparatus 60. The manipulating section 64 is manipulated by the user when the user issues various instructions to the navigation apparatus 24. Note that a touch panel display in which the display section 23 and manipulating section 64 are combined may be used. The audio output section 66 outputs audio relating to route guidance, notification of various types of information, and the like. The information storage section 68 stores data such as map data. The vehicle signal I/F 70 provides signal transmission and reception between the control apparatus 60 and sensors (not shown in the drawing), such as a vehicle velocity sensor, which detect information relating to the current geographical position and the like.

The wireless I/F 72 provides signal transmission and reception between the control apparatus 60 and the communication control unit 25. The communication control unit 25 transmits and receives radio waves via an antenna 76 to communicate with the smart device 20 via the mobile communication network 16 or the short-range wireless communication 18. The GPS receiving section 74 captures GPS radio waves from a positioning satellite with an antenna 78, and identifies the position of the current location based on these GPS radio waves.

The smart device 20 is capable of communicating with the charging control apparatus 22 of the electric vehicle 10, through wireless communication via the mobile communication network 16 or the short-range wireless communication 18, both inside and outside of the electric vehicle 10.

The navigation apparatus 24 is capable of communicating with the management server 82 described further below, a server of a power supplier (not shown in the drawings), and the like, via the mobile communication network 16, the Internet (not shown in the drawings), and a public communication network (not shown in the drawings). The management server 82 is capable of communicating with the power supplier through the public communication network and the Internet.

Returning to FIG. 1, the charging equipment 14, which is connected to a grid power supply (not shown in the drawings) of the power supplier, is installed at home or a workplace of the user of the electric vehicle 10, a charging stand along a public road, or the like. The charging equipment 14 includes a charging cord 34 that has a charging plug (charging gun) 32 provided at the tip thereof.

After the user has finished one day of using the electric vehicle 10 and returned home, the user attaches the charging plug 32 to a charging port (connector) 36 of the electric vehicle 10. As a result, the charging equipment 14 and the charging port 36 are electrically connected in a state where charging is possible. The charging cord 34 has one end connected to the charging equipment 14, and the other end connected to the charging plug 32.

In this case, under the control of the charging control apparatus 22, the battery 30 is charged from the charging equipment 14 during a late-night time period when the electricity price (power price) is usually lower than during the day. If this charging is insufficient, the battery 30 is charged from the charging equipment 14 during the day time when the electricity price is relatively high.

Just because the electric vehicle 10 is connected to the charging equipment 14 via the charging cord 34 does not mean that the battery 30 is being charged.

The schedule (charging plan) for charging or not charging the battery 30 is determined by a judging section 42 of the charging control apparatus 22. There may be cases where the charging control apparatus 22 stops or suspends the charging of the battery 30 even when the electric vehicle 10 is being connected to the charging equipment 14. When departing on the following day after the charging has finished, the user removes the charging plug 32 from the charging port 36 and closes the charging lid (not shown in the drawings). After this, the user attaches the charging plug 32 at the home position on the charging equipment 14.

The charging control apparatus 22 is formed by a microcomputer that functions as the various functional sections by having one or more CPUs execute a program stored in a memory. The charging control apparatus 22 includes, in addition to a storage section 40 that is the memory, the judging section 42 serving as a computing section, the implementing section 44, and a notifying section 46.

The charging control apparatus 22 controls charging of the battery 30 (charging implemented based on the charging schedule) when the charging plug 32 of the charging equipment 14 is connected to the charging port 36 of the electric vehicle 10.

Under prescribed conditions, the notifying section 46 provides notification, such as prompting the charging of the battery 30, to the smart device 20 of the user through the communication control unit 25. The notification such as prompting the charging of the battery 30 is also provided to the on-board display section 23, and may be provided by the audio output section 66.

If the smart device 20 is located within the effective communication area of the short-range wireless communication 18, the notification prompting the charging is provided to the smart device 20 through the short-range wireless communication 18. If the smart device 20 is located outside of the effective communication area of the short-range wireless communication 18, the notification is provided through the mobile communication network 16. Upon receiving instructions requesting charging of the battery 30 from the judging section 42, the implementing section 44 of the charging control apparatus 22 charges the battery 30 up to the remaining capacity (target state of charge (SOC)) indicated by the instructions from the judging section 42.

The following describes the operation performed by the (CPU of the) charging control apparatus 22 of the system 12 configured basically as described above, in order of a [First Embodiment], a [Second Embodiment], and a [Third Embodiment]. In each drawing referenced below, shared portions or corresponding portions are given the same reference numerals, and redundant descriptions are omitted.

First Embodiment

Figure 3:
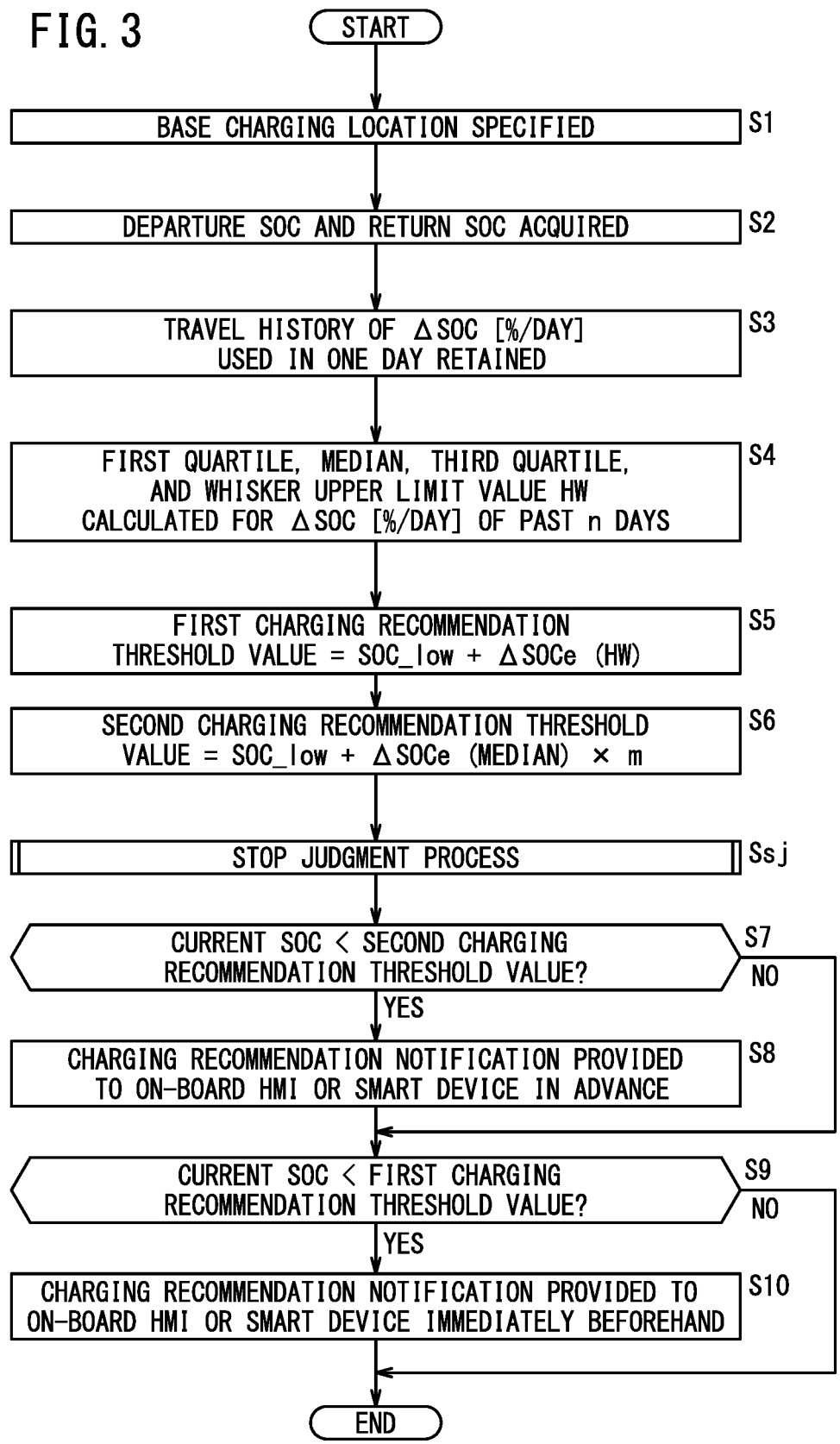
FIG. 3 is a flow chart used to describe the operation of a first embodiment.

The following description references the flow chart of FIG. 3.

The subject executing a program according to this flow chart is the charging control apparatus 22 (any one of the judging section 42, the implementing section 44, and the notifying section 46, excluding the storage section 40).

At step S1, a base charging location (prescribed charging location) 80 of the electric vehicle 10 is specified. Here, a house (home) having the charging equipment 14 is specified through the manipulating section 64, under the control of the judging section 42. More specifically, a measured position of the electric vehicle 10 detected by the GPS receiving section 74 in a state where the charging plug 32 is electrically connected to the charging port 36 of the charging equipment 14 after the electric vehicle 10 has returned home is specified as the base charging location (also referred to as the home or house for the sake of convenience in the present embodiment) 80. The base charging location 80 is recorded in advance in the storage section 40. Alternatively, the user may select a specified location in a map application of the navigation apparatus 24 (which may be connected to the smart device 20) or the management server 82 described further below, and register the positional coordinates (longitude/latitude) of this location as the base charging location 80.

At step S2, the remaining capacity of the battery 30, which is the SOC (remaining capacity SOC) [%] in the present embodiment, at the time of departure of the electric vehicle 10 from the house 80 is recorded in the storage section 40.

The remaining capacity is not limited to being the SOC [%], and may instead be a power amount [Wh] or ampere hours [Ah]. The same is true below.

Also at step S2, the remaining capacity SOC of the battery 30 at the time when the electric vehicle 10 has returned to the house 80 (arrived at home) is recorded in the storage section 40.

Next, at step S3, a one-day consumption amount (one-day usage amount) of the battery 30, which is the difference between the remaining capacity SOC at the time of departure and the remaining capacity SOC at the time of returning, is obtained as ΔSOC {one-day consumption amount (one day of electricity consumption or one-day usage amount) ΔSOC or daily consumption amount ΔSOC} [%/day] and recorded in the storage section 40.

The process of calculating the one-day consumption amount (one-day usage amount) ΔSOC from step S2 to step S3 may be performed in the following manner. Specifically, every time the electric vehicle 10 is used and the battery remaining capacity SOC decreases, such as when travelling or using the air conditioning, the difference between the remaining capacity SOC of the battery 30 at the usage start timing and the remaining capacity SOC at the usage end timing may be set as a one-time consumption amount, and a plurality of one-time consumption amounts may be added together to obtain the one-day consumption amount (one-day usage amount) ΔSOC.

Furthermore, this calculation of the one-day consumption amount (one-day usage amount) ΔSOC in the present embodiment assumes that the electric vehicle 10 is stopped and charged at the base charging location (home) 80 every day. If the usage is limited due to a reason such as the charging equipment 14 registered as the base charging location being shared charging equipment in an apartment area and there is an opportunity for charging only once every two days, for example, a two-day consumption amount may be calculated.

After returning, when the user connects the charging plug 32 to the charging port 36, the battery 30 is charged from the charging equipment 14 up to a target SOC set by the charging control apparatus 22 or the user.

Every time the processing of steps S2 and S3 is repeated (once per day in the present embodiment), a travel history for the most recent n days (n is an integer greater than or equal to 2 and less than or equal to 31) is recorded in the storage section 40. Statistical processing is performed at step S4 on the travel history recorded in the storage section 40. By performing the statistical processing on the n-days of the daily consumption amount ΔSOC, a one-day estimated consumption amount ΔSOCe of the electric vehicle 10 corresponding to the usage tendency of the electric vehicle 10 by the user (daily travel distance, number of charges, one-time charging amount, and the like) is calculated.

In the statistical processing of step S4, a first quartile, a median, a third quartile, and a maximum value excluding outliers ("whisker upper limit value HW" in the box-and-whisker plot in the present embodiment) are obtained for the daily consumption amount ΔSOC [%/day] of the past n days. The interquartile range is the range from the third quartile to the first quartile.

The whisker upper limit value HW is calculated as shown in Expression (1), as is widely known.

$$HW = \text{third quartile} + 1.5 \times \text{maximum value of data in interquartile range} \quad \text{Expression (1):}$$

Next, threshold values of the remaining capacity SOC for providing the user with a notification recommending performance of the charging operation are obtained, based on the statistical values described above. A first charging recommendation threshold value (also referred to as a first threshold value) indicated by Expression (2) below is obtained at step S5, and a second charging recommendation threshold value (also referred to as a second threshold value) indicated by Expression (3) below is obtained at step S6, as the above threshold values.

$$\text{first charging recommendation threshold value} = \quad \text{Expression (2)}$$
$$\text{lower limit remaining capacity} +$$
$$\{\text{estimated consumption amount (median)} + \text{margin}\} =$$
$$\text{lower limit remaining capacity} +$$
$$\text{whisker upper limit value} = \text{SOC\_low} + \Delta SOCe\,(HW)$$

In Expression (2), the lower limit remaining capacity SOC_low is the remaining capacity SOC (set as a default by the charging control apparatus 22) at which it is thought that the user will feel worried by a decrease in the remaining capacity of the battery during travel, or the remaining capacity at which the user feels worried as set in advance by the user themselves.

In Expression (2) for the first charging recommendation threshold value, a "value between the third quartile and the whisker upper limit value HW" may be used as the setting value instead of the "whisker upper limit value HW".

Alternatively, in Expression (2) for the first charging recommendation threshold value, a "prescribed value of a consumption amount back-calculated from the cumulative frequency distribution such that the risk of electricity shortage is less than or equal to a prescribed probability (described in detail in the second embodiment)" may be used as the setting value instead of the "whisker upper limit value HW".

$$\begin{aligned}
\text{second charging recommendation threshold value} = &\quad \text{Expression (3)}\\
&\text{lower limit remaining capacity} + \\
&\{\text{estimated consumption amount (median)} + \text{margin}\} = \\
&\text{lower limit remaining capacity} + \\
&\{\text{estimated consumption amount (median)} \\
&+ \text{estimated consumption amount (median)} \times (m-1)\} = \\
&\text{lower limit remaining capacity} + \\
&\{\text{estimated consumption amount (median)} \times m\} \\
&= \text{SOC\_low} + \Delta SOCe \text{ (median)} \times m
\end{aligned}$$

In Expression (3), the number of days m, which is a multiplier, can be set to the number of days (m) in advance that the user wants to receive notification that the lower limit remaining capacity SOC_low at which the user becomes worried will be reached. Instead of the "estimated consumption amount (median)" used in the calculation of the second charging recommendation threshold value shown in Expression (3), an "estimated consumption amount (average value)", an "estimated consumption amount (mode)", or an "estimated consumption amount (maximum value of probability density function) (described in detail in the third embodiment)" may be used as the setting value.

As an example, if the user wants to receive the notification two days in advance (m=2), the second charging recommendation threshold value shown in Expression (3) is set according to Expression (4) below. It should be noted that the number of days m depends on the rated capacity of the battery 30 loaded in the electric vehicle 10, and is set to any integer from 2 to 31, for example.

$$\begin{aligned}
\text{second charging recommendation threshold value} = &\quad \text{Expression (4)}\\
&\text{SOC\_low} + \Delta SOCe \text{ (median)} \times 2 = \\
&\text{SOC\_low} + \Delta SOCe \text{ (median)} + \Delta SOCe \text{ (median)} = \\
&\text{lower limit remaining capacity} + \Delta SOCe \text{ (median)} + \\
&\text{margin value} = \text{lower limit remaining capacity} + \\
&\{\text{estimated consumption amount (median)} + \text{margin value}\}
\end{aligned}$$

Figure 4:
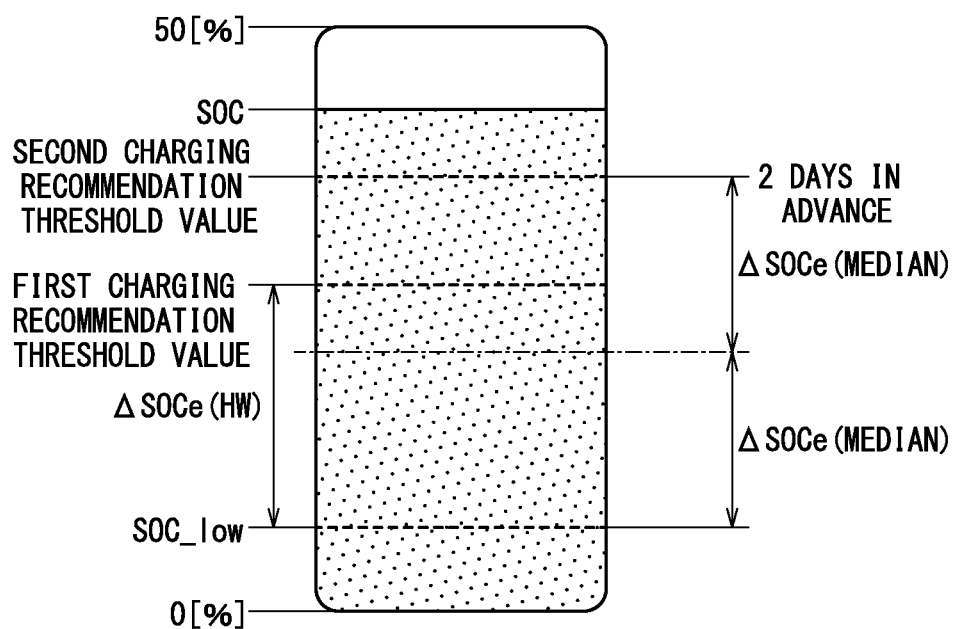
FIG. 4 is an explanatory diagram showing a relationship between the remaining capacity and threshold values.

FIG. 4 is an explanatory diagram showing the relationship between the remaining capacity SOC, and the first charging recommendation threshold value (Expression (2)) and second charging recommendation threshold value (Expression (4)).

In the statistical processing of step S4, for the past n days of the daily SOC [%/day], data may be classified into categories, and each of the statistical values, such as the first quartile, the median, the third quartile, and the "whisker upper limit value HW" in the box-and-whisker plot, may be calculated. For example, categories such each day of the week or weekday/weekend groupings are envisioned.

In this case, for $\Delta$SOCe (HW) and $\Delta$SOCe (median) used for calculating the first charging recommendation threshold value and the second charging recommendation threshold value shown in Expressions (2) to (4), the estimated consumption amount $\Delta$SOCe corresponding to a category of the day (each day of the week or weekday/weekend groupings) for which the consumption amount is estimated is calculated.

FIG. 4 shows an enlarged view of the battery SOC from 0[%] to 50[%], as an example of the calculation of the first charging recommendation threshold value and the second charging recommendation threshold value. The lower limit remaining capacity SOC_low (set as a default by the charging control apparatus 22) at which it is thought that the user will feel worried is set to approximately 10 [%], for example.

Figure 5:
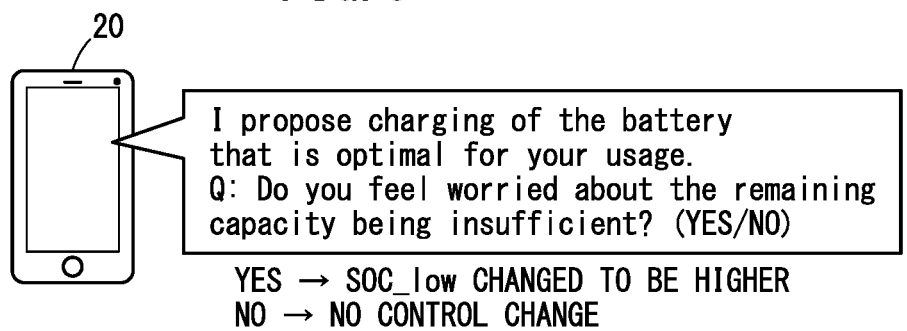
FIG. 5 is an explanatory diagram showing a setting example of a lower limit remaining capacity.

FIG. 5 is an explanatory diagram showing an example of a technique for obtaining user feedback (the degree of worry about an electricity shortage) for the setting of the lower limit remaining capacity SOC_low, after the user of the electric vehicle 10 has used the electric vehicle 10 for a certain period.

In other words, after the electric vehicle 10 has been used for the certain period, the implementing section 44 of the charging control apparatus 22 wirelessly provides a notification and communicates with the smart device 20 of the user, through the notifying section 46 via the communication control unit 25.

In the example of FIG. 5, a question of "I propose charging of the battery that is optimal for your usage. Q: Do you feel worried about the remaining capacity being insufficient? (YES/NO)" is posed. If the answer "YES" is provided through the smart device 20, the implementing section 44 or the judging section 42 changes the lower limit remaining capacity SOC_low to be higher, and if the answer "NO" is provided, the implementing section 44 or judging section 42 does not change the lower limit remaining capacity SOC_low.

The user setting of the lower limit remaining capacity SOC_low described above may be performed using the on-board HMI, that is, the display section 23, the manipulating section 64, and the audio output section 66 of the navigation apparatus 24.

As a result of the processing up to the process of calculating the charging recommendation threshold values (first charging recommendation threshold value and second charging recommendation threshold value) from step S1 to step S6 described above, processing of a preparation stage of the charging control method of the first embodiment ends.

Next, processing of an application (utilization) stage of the charging control method (process of providing charging recommendation notification to the user based on the charging recommendation threshold values) according to the processing of step S7 and onward is described.

The processing of the application stage of the charging control method is started with the prerequisite that the electric vehicle 10 has stopped at the base charging location 80 after the processing of the preparation stage has ended.

Figure 6:
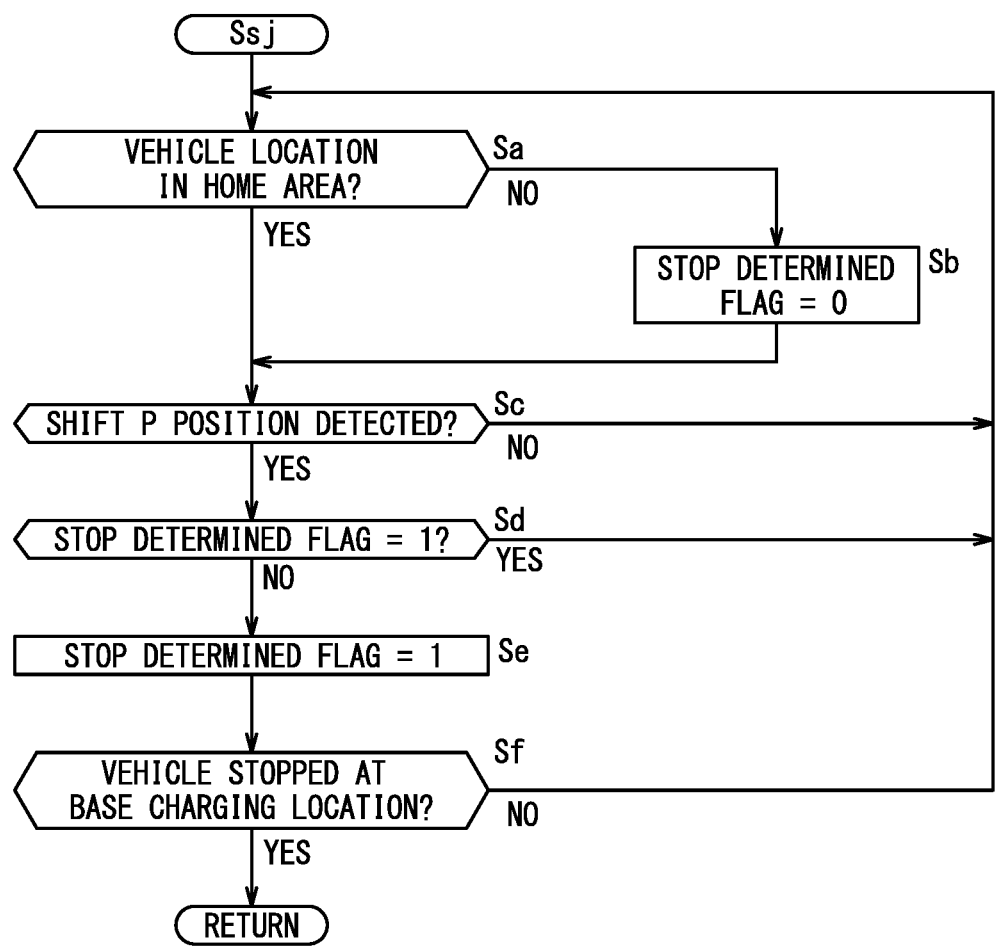
FIG. 6 is a flow chart used to describe a stop judgment process of judging that the electric vehicle has stopped at a base charging location.

The stop judgment process of step Ssj for judging whether the electric vehicle 10 has stopped at the base charging location 80, which is the prerequisite, is described while referencing the flow chart shown in FIG. 6.

At step Sa, a judgment is made as to whether the vehicle location is within a home area.

Figure 7:
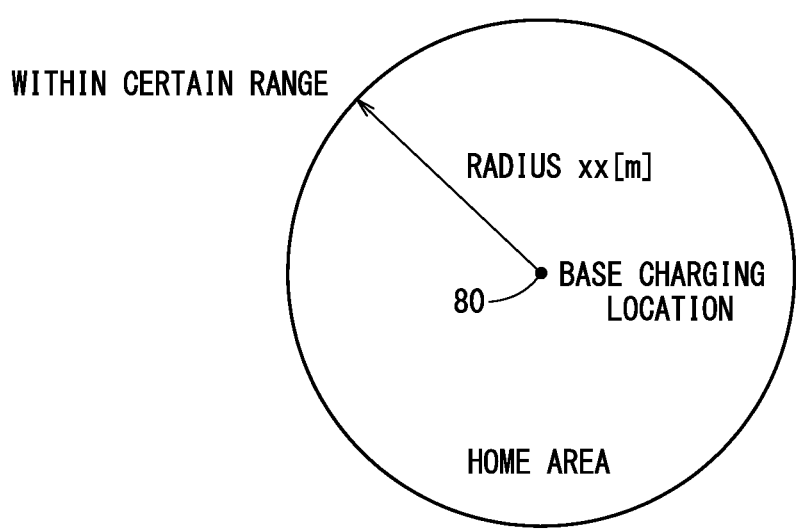
FIG. 7 is an explanatory diagram used to describe a home area.

FIG. 7 is an explanatory diagram used to describe a home area as an example.

The home area is set to be within a certain range having a radius of xx [m] from the base charging location 80.

If the vehicle location is outside the home area (step Sa: NO), a stop determined flag is reset (stop determined flag=0) at step Sb, and the process proceeds to step Sc.

If the vehicle location is within the home area (step Sa: YES), the process proceeds directly to step Sc.

At step Sc, a detection judgment is made as to whether a shift position (not shown in the drawings) has been set to a parking position (referred to as "shift P").

If the shift position is not set to shift P (step Sc: NO), the electric vehicle 10 is judged as not being stopped and the process returns to step Sa.

If the shift position is set to shift P (step Sc: YES), the process proceeds to step Sd.

At step Sd, a judgment is made as to whether the stop determined flag is set (stop determined flag=1).

If this flag is set (step Sd: YES), the process returns to step Sa, and if this flag is not set (step Sd: NO), the process proceeds to step Se. At step Se, the stop determined flag is set (stop determined flag=1).

If the stop determined flag is in the set state, a judgment is made at step Sf as to whether the electric vehicle 10 is stopped at the base charging location 80. If the electric vehicle 10 is not stopped at the base charging location 80 (step Sf: NO), the process returns to step Sa, and if the electric vehicle 10 is stopped at the base charging location 80 (step Sf: YES), the process proceeds to step S7 of FIG. 3.

In the stop judgment process for judging whether the electric vehicle 10 is stopped at the base charging location 80 described above with reference to FIG. 6, (i) to (v) shown below are realized.

(i): After the preparation stage has ended, if the shift position of the electric vehicle 10 has been set to shift P first at the base charging location 80 (for example, home), the process proceeds to the processing of the utilization stage (charging recommendation notification). In other words, this corresponds to a case in which the processing is performed in the order of step S6->step Sa: YES->step Sc: YES->step Sd: NO->step Se->step Sf: YES.

(ii): If the shift position of the electric vehicle 10 has been set to shift P while away from home, the process does not proceed to the processing of the utilization stage (charging recommendation notification). In other words, this corresponds to a case in which the processing is performed in the order of step S6->step Sa: NO->step Sb->step Sc: YES->step Sd: NO->step Se->step Sf: NO.

(iii): After the shift position has been set to shift P at home, if the shift position is set to shift R (reverse position) and then is again set to shift P, the process does not proceed to the processing of the utilization stage (charging recommendation notification). In other words, this corresponds to a case in which, for example, even after the electric vehicle 10 has been confirmed to have stopped once within the home area at step Sa, the parking of the electric vehicle 10 is adjusted and step Sf is no longer established.

(iv): After the shift position has been set to shift P at home in the same manner as in (iii), if the shift position is set to shift P at a nearby convenience store within the home area, the process does not proceed to the processing of the utilization stage (charging recommendation notification).

(v): After the shift position has been set to shift P at home, if normal usage is performed (the electric vehicle 10 is used for travel) and then the shift position is again set to shift P at home, the process proceeds to the processing of the utilization stage (charging recommendation notification).

At step Ssj, if it is detected that the electric vehicle 10 has returned to the base charging location 80, the process returns to the flow chart of FIG. 3 and, at step S7, a judgment is made as to whether the current remaining capacity SOC is less than the second charging recommendation threshold value (FIG. 4).

If this judgment is affirmative (step S7: YES, current remaining capacity SOC<second charging recommendation threshold value), at step S8, the charging recommendation notification is provided to the on-board HMI or the smart device 20 in advance (which in this case is two days in advance since m=2, including the day on which charging by the charging equipment 14 is scheduled), and the process proceeds to step S9.

If the judgment of step S7 is negative (step S7: NO), the process proceeds to step S9.

At step S9, a judgment is made as to whether the current remaining capacity SOC is less than the first charging recommendation threshold value (FIG. 4).

If this judgment is affirmative (step S9: YES, current remaining capacity SOC<first charging recommendation threshold value), at step S10, the charging recommendation notification is provided to the on-board HMI or the smart device 20 immediately beforehand (the day on which charging by the charging equipment 14 is scheduled), and the process ends.

If the judgment of step S9 is negative (step S9: NO), the process ends.

In the processing of the flow chart of FIG. 3, there are cases where magnitudes of the first charging recommendation threshold value and the second charging recommendation threshold value are switched due to the value of the whisker upper limit value HW.

In such a case, the notification may be provided m days in advance by switching the second charging recommendation threshold value to the first charging recommendation threshold value, and the second charging recommendation threshold value may be set as shown in Expression (5) below.

second charging recommendation threshold value=first charging recommendation threshold value+$\Delta SOC$ (median)    Expression (5):

If set in the manner shown in Expression (5), the second charging recommendation threshold value obviously becomes greater than the first charging recommendation threshold value (second charging recommendation threshold value>first charging recommendation threshold value).

As an example, in the case of a user who feels little worry or no worry about an electricity shortage according to the result of the question concerning the worry (degree of worry) of the user about an electricity shortage described with reference to FIG. 5, the second charging recommendation threshold value may be deactivated and only the first charging recommendation threshold value may be activated. As a result, it is possible to reduce the irritation the user feels toward the recommendation notification.

After this, upon receiving instructions requesting charging of the battery 30 from the judging section 42, the implementing section 44 of the electric vehicle 10 whose charging is controlled by the charging control apparatus 22 charges the battery 30 up to the remaining capacity (target SOC) indicated by the instructions from the judging section 42.

[Effect of the First Embodiment]

By setting the lower limit remaining capacity SOC_low for the battery 30 in advance, worry about an electricity shortage felt by the user is eliminated.

Furthermore, with the charging recommendation threshold value (first charging recommendation threshold value or second charging recommendation threshold value) set to be a value obtained by adding the estimated consumption amount (a value in a range from the third quartile to the sum of the third quartile and the whisker upper limit value, or a value that is the daily consumption amount ΔSOC multiplied by the number of days m) to the lower limit remaining capacity SOC_low set in advance, charging is recommended at a suitable timing. Therefore, it is possible to prevent early charging from occurring unnecessarily despite a battery remaining capacity sufficient for enabling travel on the following day remaining. As a result, by increasing the usage frequency in the low SOC region, it is possible to avoid standing deterioration due to the remaining capacity SOC while at high charge (including full charge), and to improve the convenience of the user by restricting the number of times charging is performed (charging frequency). The charging recommendation threshold value is set to be a remaining SOC that is as small as possible while being in a range that does not cause a problem in travel on the following day, and is 30 [%], for example.

Furthermore, since it is possible to set both the day on which the user wants to receive notification (m days, m≥2) and whether the notification function is ON or OFF while suppressing worry about an electricity shortage, the hassle of receiving a notification every day can be eliminated. The notification function ON/OFF setting may be performed individually for each of the first charging recommendation threshold value and the second charging recommendation threshold value.

Yet further, by making the marginal charging amount (first charging recommendation threshold value) a setting value between the third quartile and the whisker calculated from the consumption amount of n days, it can be set to be greater than the median of the daily consumption amount ΔSOC, and worry about an electricity shortage can be further suppressed.

Yet further, by providing the notification in stages according to the remaining capacity SOC of the battery 30 (on a day m days in advance when the SOC drops below the second charging recommendation threshold value, and after returning on the day when the SOC drops below the first charging recommendation threshold value), it is possible to remind the user of the need for charging in advance. Therefore, it is possible to suitably suppress worry about an electricity shortage.

Yet further, since the degree of worry felt by the user about an electricity shortage is acquired, and the first charging recommendation threshold value and second charging recommendation threshold value are set to be higher values as this degree of worry about an electricity shortage becomes higher, it is possible to provide suitable notification according to how the user feels about an electricity shortage.

Second Embodiment

Figure 8:
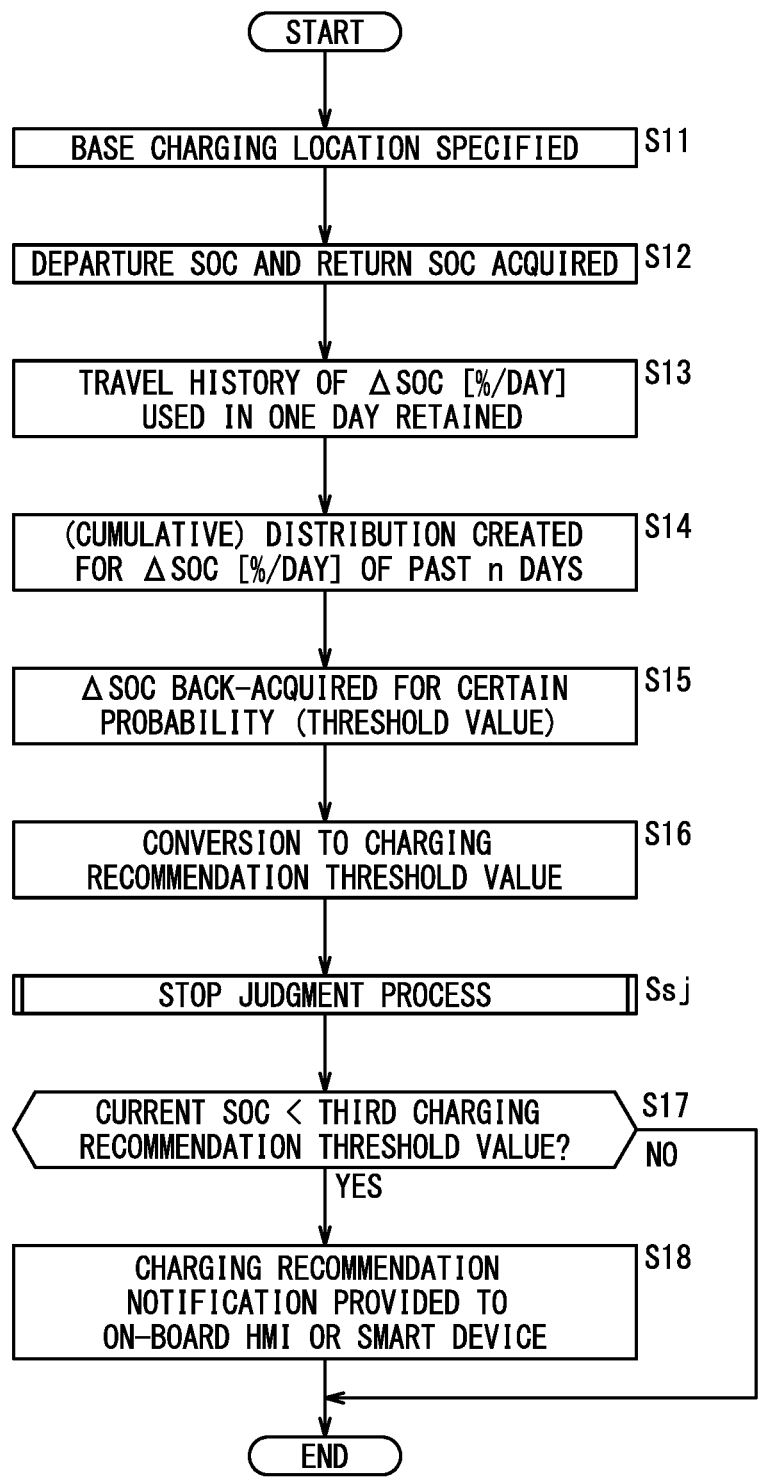
FIG. 8 is a flow chart used to describe the operation of a second embodiment.

The following description references the flow chart of FIG. 8.

The subject executing a program according to this flow chart is the charging control apparatus 22 (any one of the judging section 42, the implementing section 44, and the notifying section 46, excluding the storage section 40).

At step S11, in the same manner as in step S1, the base charging location 80 of the electric vehicle 10 is specified.

At step S12, in the same manner as in step S2, the remaining capacity SOC of the battery 30 at the time of departure and the remaining capacity SOC of the battery 30 upon returning home (arriving at home) are recorded in the storage section 40.

At step S13, in the same manner as in step S3, a one-day consumption amount of the battery 30, which is the difference between the remaining capacity SOC at the time of departure and the remaining capacity SOC at the time of returning, is obtained as the daily consumption amount ΔSOC and recorded in the storage section 40.

Upon returning, the user connects the charging plug 32 to the charging port 36, and the battery 30 is charged from the charging equipment 14 up to the target SOC set by the user.

Every time the processing of steps S12 and S13 is repeated (once per day in the present embodiment), a travel history for the most recent n days is recorded in the storage section 40, and statistical processing is performed on the travel history at step S14. By performing the statistical processing on the n days of the daily consumption amount ΔSOC, an estimated consumption amount corresponding to the usage tendency of the user is calculated.

In the statistical processing of step S14, a cumulative distribution of the daily consumption amount ΔSOC [%/day] of the past n days is calculated.

Figure 9:
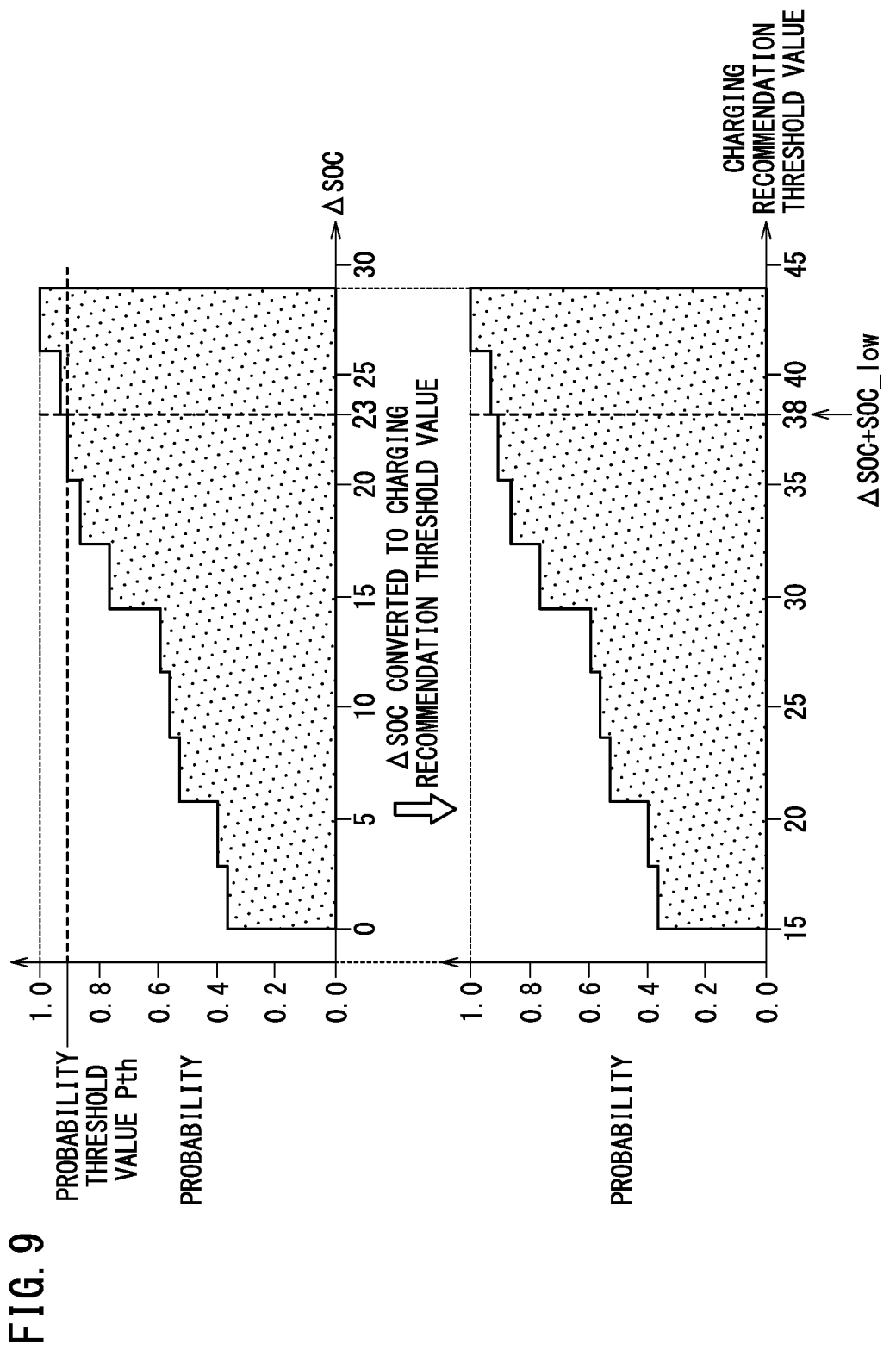
FIG. 9 includes a top graph that is a cumulative distribution graph showing a probability threshold value of the consumption amount, and a bottom graph that is a conversion graph of a charging recommendation threshold value based on the probability threshold value.

The top graph of FIG. 9 shows a cumulative distribution graph of the daily consumption amount ΔSOC of the past n days. The horizontal axis indicates the daily consumption amount ΔSOC, and the vertical axis indicates the probability.

Next, at step S15, with a prescribed probability at which the ΔSOC of the following day becomes less than a given SOC threshold value as a probability threshold value Pth, a prescribed daily consumption amount ΔSOC that is greater than or equal to the probability threshold value Pth and does not impede travel on the following day is back-acquired from the cumulative distribution graph in the top graph of FIG. 9.

The probability threshold value Pth [%] is obtained from an electricity shortage risk (ESR) of a user setting.

Figure 10:
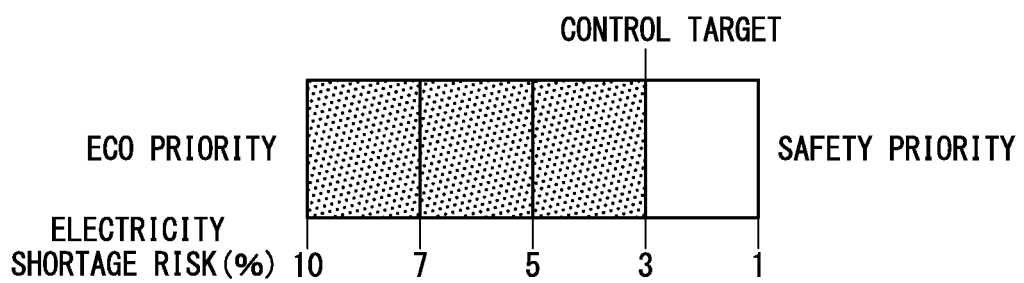
FIG. 10 is an explanatory diagram showing a relationship between eco priority and safety priority for the electricity shortage risk.

FIG. 10 shows an example in which the electricity shortage risk ESR is set to 3 [%], as a control target. When the electricity shortage risk ESR is lower, the worry felt by the user is eliminated and the feeling of safety becomes greater (safety priority), and when the electricity shortage risk ESR is higher, the worry felt by the user becomes greater but the charging recommendation threshold value becomes lower, which is more eco-friendly (eco priority) due to extending the lifetime of the battery 30.

The top graph of FIG. 9 shows that, when the electricity shortage risk ESR is set to 10 [%] and the probability threshold value Pth (Pth=100−ESR) at which the ΔSOC of the following day becomes less than or equal to the given SOC threshold value is set to 90 [%], ΔSOC of 23 [%/day] is back-acquired as the prescribed daily consumption amount ΔSOC.

At step S16, a charging recommendation threshold value (referred to as a third charging recommendation threshold value) is set as shown in Expression (6) below.

$$\text{third charging recommendation threshold value} = \\ \text{lower limit remaining capacity} + $$

Expression (6)

-continued

{estimated consumption amount (probability maximum) + margin} = lower limit remaining capacity + prescribed daily consumption amount = SOC_low + $\Delta SOC$

Here, the lower limit remaining capacity SOC_low is set to be a remaining capacity SOC at which it is thought that the user will feel worried (default setting) or to be a remaining capacity at which the user feels worried as set in advance by the user themselves, and is set to 15 [%], for example.

Accordingly, here, the third charging recommendation threshold value is set such that third charging recommendation threshold value=15+23=38.

The bottom graph of FIG. 9 is a conversion graph of the charging recommendation threshold value based on the probability threshold value, in which the lower limit remaining capacity SOC_low is applied to the prescribed daily consumption amount $\Delta SOC$ to obtain the third charging recommendation threshold value (=38).

The setting of the lower limit remaining capacity SOC_low may be obtained through feedback from the user after the electric vehicle 10 has been used for a certain period, as described with reference to FIG. 5.

As a result of the processing up to the process of calculating the charging recommendation threshold value (third charging recommendation threshold value) from step S11 to step S16 described above, processing of a preparation stage of the charging control method of the second embodiment ends.

Next, the stop judgment process of step Ssj described above with reference to FIGS. 6 and 7 is performed.

Next, processing of an application (utilization) stage of the charging control method (process of providing charging recommendation notification to the user based on the third charging recommendation threshold value) according to the processing of step S17 and onward is described.

At step Ssj, if it is detected that the electric vehicle 10 has returned to the base charging location 80, the process returns to the flow chart of FIG. 8 and, at step S17, a judgment is made as to whether the current remaining capacity SOC is less than the third charging recommendation threshold value.

If this judgment is affirmative (step S17: YES, current remaining capacity SOC<third charging recommendation threshold value), at step S18, the charging recommendation notification is provided to the on-board HMI or the smart device 20 and the process ends.

If the judgment of step S17 is negative (step S17: NO), this instance of the process ends without notification being provided.

After this, upon receiving instructions requesting charging of the battery 30 from the judging section 42, the implementing section 44 of the electric vehicle 10 whose charging is controlled by the charging control apparatus 22 charges the battery 30 up to the remaining capacity (target SOC) indicated by the instructions from the judging section 42.

In a manner similar to the first embodiment, the second charging recommendation threshold value and the third charging recommendation threshold value may be combined.

[Effect of the Second Embodiment]

A probability at which the consumption amount of the following day becomes less than or equal to a given consumption amount is calculated from the probability distribution of the consumption amounts of n days, and the marginal charging amount is set to a consumption amount causing this calculated probability to become greater than or equal to a prescribed probability, and therefore it is possible to set suitable charging recommendation threshold values according to the feeling of the user toward an electric shortage.

Third Embodiment

Figure 11:
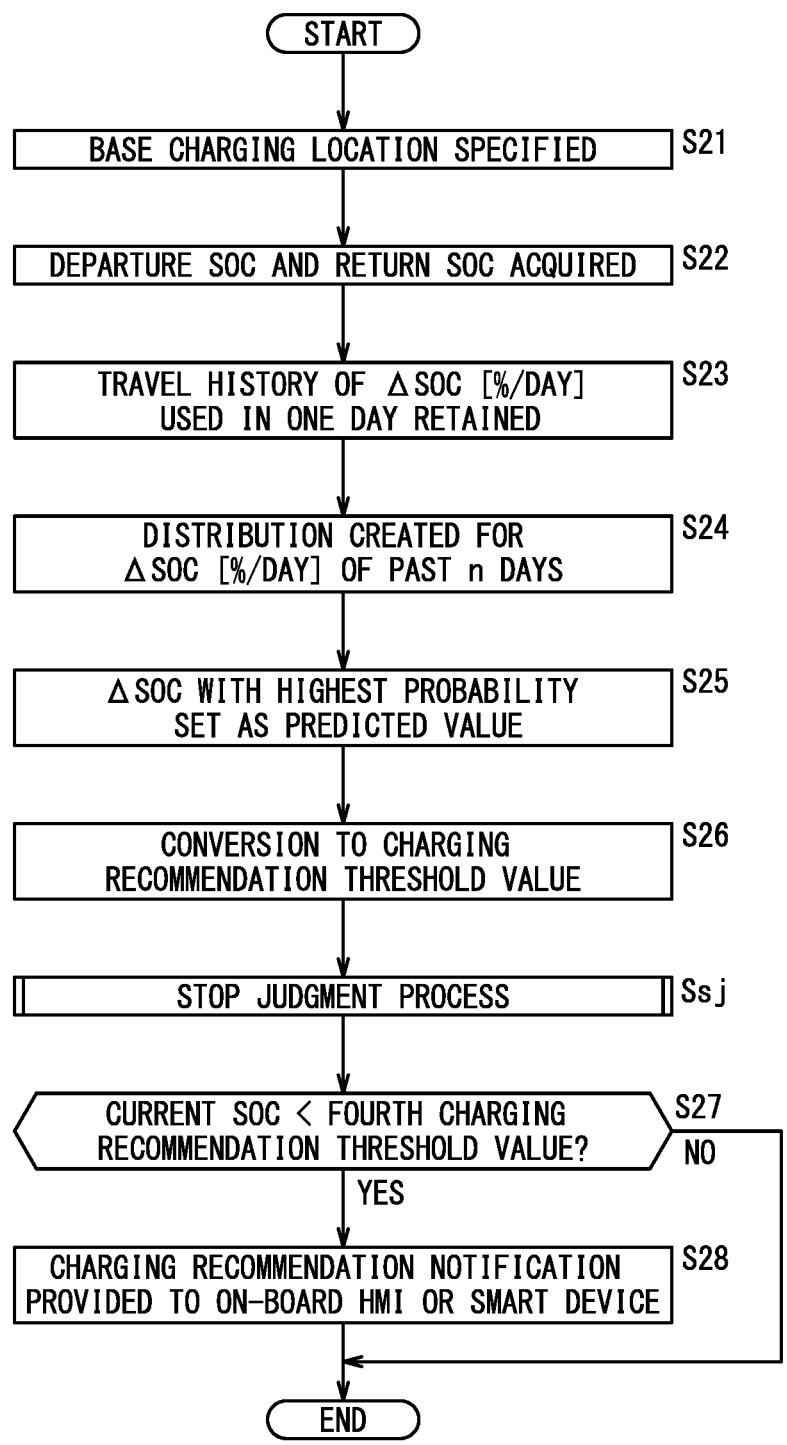
FIG. 11 is a flow chart used to describe the operation of a third embodiment.

The following description references the flow chart of FIG. 11.

The subject executing a program according to this flow chart is the charging control apparatus 22 (any one of the judging section 42, the implementing section 44, and the notifying section 46, excluding the storage section 40).

At step S21, in the same manner as in step S1, the base charging location 80 of the electric vehicle 10 is specified.

At step S22, in the same manner as in step S2, the remaining capacity SOC of the battery 30 at the time of departure and the remaining capacity SOC of the battery 30 upon returning (arriving at home) are recorded in the storage section 40.

At step S23, in the same manner as in step S3, a one-day consumption amount of the battery 30, which is the difference between the remaining capacity SOC at the time of departure and the remaining capacity SOC at the time of returning, is obtained as the daily consumption amount $\Delta SOC$ and recorded in the storage section 40.

Upon returning, the user connects the charging plug 32 to the charging port 36, and the battery 30 is charged from the charging equipment 14 up to the target SOC set by the user.

Every time the processing of steps S22 and S23 is repeated (once per day in the present embodiment), a travel history for the most recent n days is recorded in the storage section 40, and statistical processing is performed on the travel history at step S24. By performing the statistical processing on the n days of the daily consumption amount $\Delta SOC$, an estimated consumption amount corresponding to the usage tendency of the user is calculated.

In the statistical processing of step S24, a distribution of the past n days of the daily consumption amount $\Delta SOC$ [%/day] is calculated in order to make a kernel density estimation.

Figure 12:
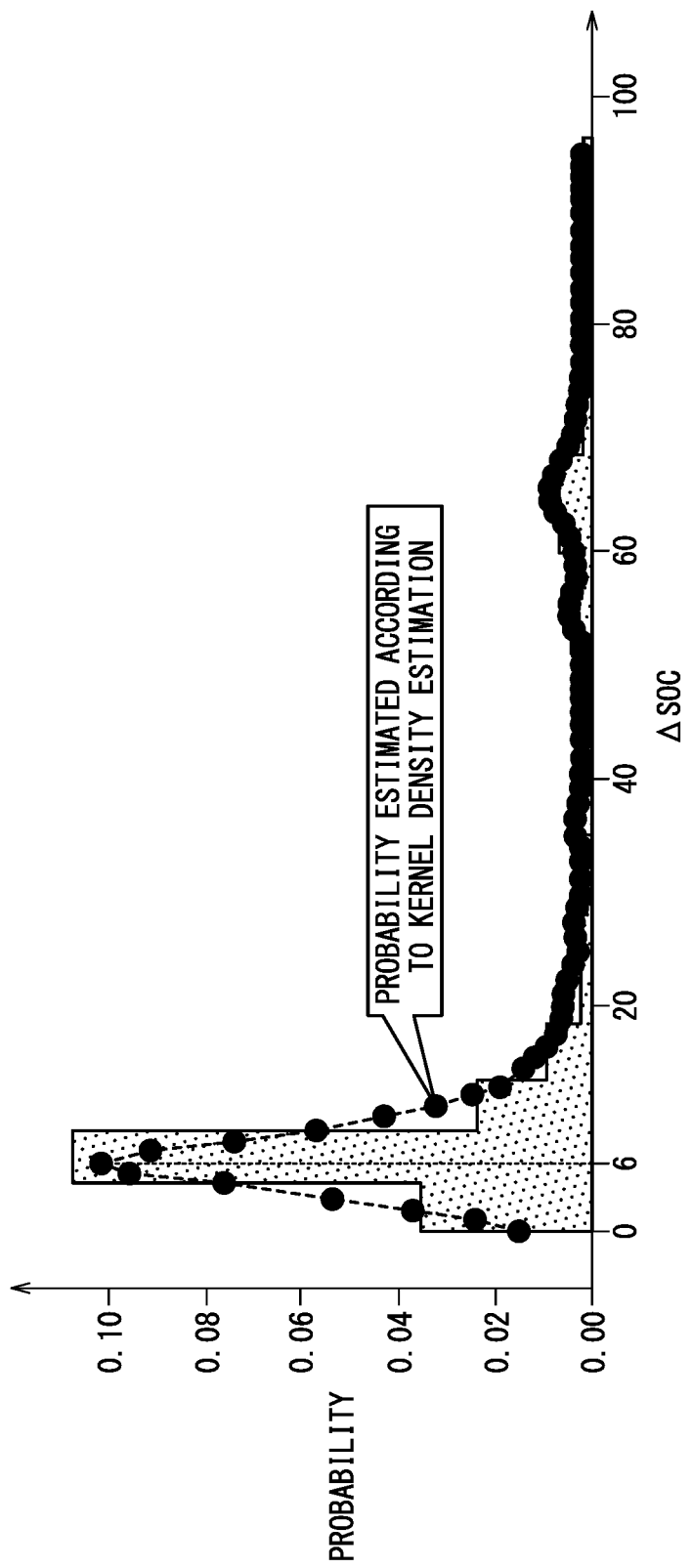
FIG. 12 is a distribution graph of the daily consumption amount obtained by distributing the past prescribed number days of the daily consumption amount in order to make a widely known kernel density estimation.

FIG. 12 is a distribution graph of the daily consumption amount $\Delta SOC$ obtained by distributing the past n days of the daily consumption amount $\Delta SOC$ in order to make a widely known kernel density estimation.

At step S25, the kernel density estimation is performed (distribution connecting the dots in FIG. 12), and the daily consumption amount $\Delta SOC$ (probability density) having the highest probability on the vertical axis is set as a predicted value. In the example of FIG. 12, the predicted value, which is the daily consumption amount $\Delta SOC$ for which the probability is highest, is $\Delta SOC$ (probability density)=6.

Next, at step S26, a charging recommendation threshold value (referred to as a fourth charging recommendation threshold value) is set as shown in Expression (7) below.

fourth charging recommendation threshold value =     Expression (7)

lower limit remaining capacity +

(estimated consumption amount + margin) =

-continued lower limit remaining capacity +

(daily consumption amount having highest probability) ×

$m$ = SOC_low + $\Delta SOC$ (probability density) × $m$

Here, the number of days m, which is a multiplier, can be set to the number of days (m) in advance that the user wants to receive notification that the lower limit remaining capacity SOC_low at which the user becomes worried will be reached.

As a result of the processing up to the process of calculating the charging recommendation threshold value (fourth charging recommendation threshold value) from step S21 to step S26 described above, processing of a preparation stage of the charging control method of the third embodiment ends.

Next, the stop judgment process of step Ssj described above with reference to FIGS. 6 and 7 is performed.

Next, processing of an application (utilization) stage of the charging control method (process of providing charging recommendation notification to the user based on the fourth charging recommendation threshold value) according to the processing of step S27 and onward is described.

At step Ssj (FIG. 6), if it is detected that the electric vehicle 10 has returned to the base charging location 80, the process returns to the flow chart of FIG. 11 and, at step S27, a judgment is made as to whether the current remaining capacity SOC is less than the fourth charging recommendation threshold value.

If this judgment is affirmative (step S27: YES, current remaining capacity SOC<fourth charging recommendation threshold value), at step S28, the charging recommendation notification is provided to the on-board HMI or the smart device 20 and the process ends.

If the judgment of step S27 is negative (step S27: NO), this instance of the process ends without notification being provided.

After this, upon receiving instructions requesting charging of the battery 30 from the judging section 42, the implementing section 44 of the electric vehicle 10 whose charging is controlled by the charging control apparatus 22 charges the battery 30 up to the remaining capacity (target SOC) indicated by the instructions from the judging section 42.

In a manner similar to the first embodiment, the first charging recommendation threshold value and the fourth charging recommendation threshold value may be combined.

[Effect of the Third Embodiment]

By setting the charging recommendation threshold value based on the kernel density distribution, it is possible to set a suitable charging recommendation threshold value.

In the first to third embodiments, the current SOC upon returning to the base charging location 80 is compared to the magnitude of the first to fourth charging recommendation threshold values, and a judgment is made as to whether a charging recommendation notification is necessary. However, a case can be envisioned where, during the period from the time of return to the time of departure on the following day, overnight battery heating, air conditioning immediately before departure, or the like are performed, thereby decreasing the remaining capacity SOC. In such a case, the scheduled consumption amount to be consumed during the period from the time of return to the time of departure on the following day may be added to the estimated consumption amount.

In such a case, with the scheduled consumption amount predicted for the period from the time of return to the time of departure on the following day being $\Delta SOC$ (adjustment amount), the departure time SOC of the following day is a value obtained by subtracting the scheduled consumption amount $\Delta SOC$ (adjustment amount) from the current SOC at the time of returning. In other words, the judgment condition concerning whether charging is necessary for each charging recommendation threshold value (first charging recommendation threshold value to fourth charging recommendation threshold value) is expressed by Expression (8) below and Expression (9) below, which is a transformation of Expression (8).

current *SOC*−scheduled consumption amount $\Delta SOC$
(adjustment amount)<each charging recommendation threshold value  Expression (8):

current *SOC*<each charging recommendation threshold value+scheduled consumption amount $\Delta SOC$ (adjustment amount)  Expression (9):

In other words, by adding the scheduled consumption amount $\Delta SOC$ (adjustment amount) to each charging recommendation threshold value (first charging recommendation threshold value to fourth charging recommendation threshold value), each charging recommendation threshold value is adjusted to be higher.

If this judgment is affirmative, the charging recommendation notification is provided to the on-board HMI or the smart device 20. As a result, it is possible to more accurately calculate charging recommendation threshold values that do not impede travel on the following day.

The embodiments described above can be modified as described below.

[First Modification]

Figure 13:
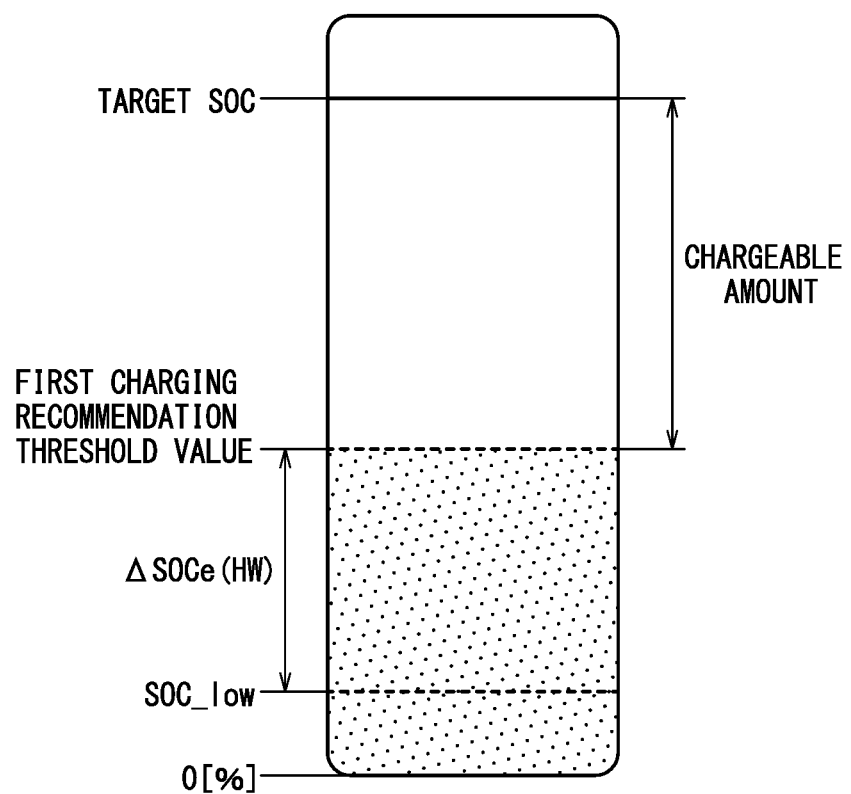
FIG. 13 is an explanatory diagram of the adjustment of the charging recommendation threshold value in consideration of charging up to the target remaining capacity, according to a first modification.

The first modification is described while referencing FIG. 13.

There are cases where, if charging is performed from a value that is lower than the first charging recommendation threshold value (or third charging recommendation threshold value, the same is true below) at the time of returning, charging up to the target remaining capacity (target SOC) cannot be performed.

FIG. 13 shows an adjusted first charging recommendation threshold value, which makes it possible to avoid the above problem and perform charging up to the target SOC.

In FIG. 13, the chargeable amount is a charging amount that the battery 30 of the electric vehicle 10 can be charged by the charging equipment 14 during a chargeable time period from the time of return to the time of departure on the following day. If the value obtained by subtracting this chargeable amount from the target SOC is greater than the first charging recommendation threshold value, the first charging recommendation threshold value is adjusted to be higher so that the value obtained by adding the chargeable amount to the first charging recommendation threshold value becomes the target SOC.

In other words, the adjusted first charging recommendation threshold value is adjusted to be a higher value obtained by subtracting the chargeable amount from the target SOC, as shown in FIG. 13.

In such a case, when it is detected that the electric vehicle 10 has returned to the base charging location 80, a judgment is made as to whether the current remaining capacity SOC is less than the adjusted charging recommendation threshold value.

If this judgment is affirmative, the charging recommendation notification is provided to the on-board HMI or the smart device 20 and the process ends. As a result, the charging operation with the remaining capacity SOC with which charging up to the target SOC can be reliably performed can be recommended to the user.

The chargeable amount described above may be replaced with a low-cost charging amount that makes it possible to perform charging within the above-described chargeable time period and during a time when the electricity cost is lowest, and the adjusted charging recommendation threshold value may then be calculated.

As a result, it is possible to recommend the charging operation with the remaining capacity SOC with which charging up to the target SOC can be reliably performed and to perform the charging during a time period when the electricity cost is lowest.

[Second Modification]

Figure 14:
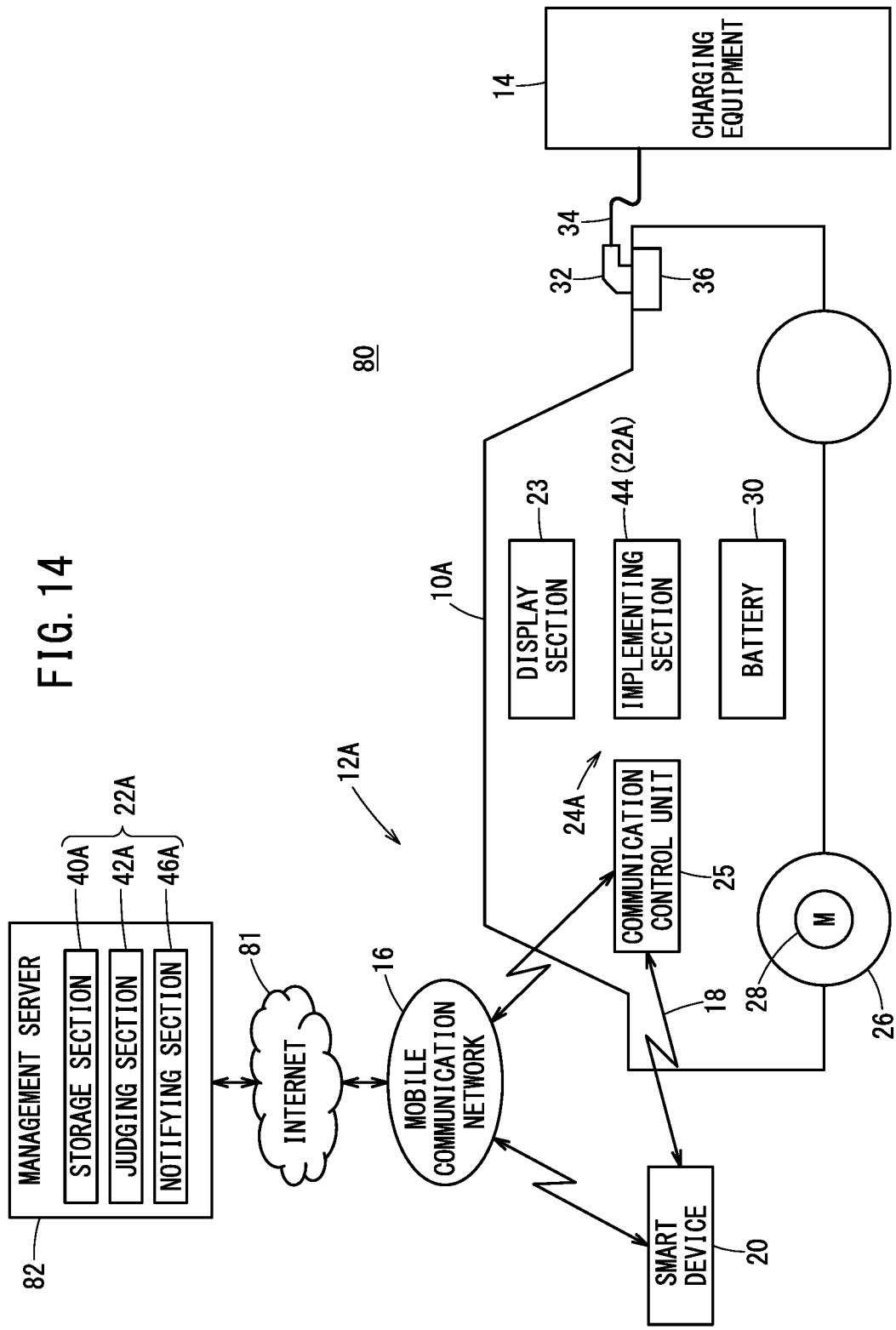
FIG. 14 is a system diagram showing a configurational example of a system according to a second modification in which a portion of a charging control apparatus, excluding an implementing section, is mounted in a management server on the Internet.

FIG. 14 is a system diagram showing a configurational example of a system 12A in which a portion of a charging control apparatus 22A is mounted in the management server 82 on the Internet 81.

The implementing section 44 is mounted in an electric vehicle 10A as a remaining portion of the charging control apparatus 22A. On the other hand, a storage section 40A, a judging section 42A, and a notifying section 46A, excluding the implementing section 44, are mounted as the charging control apparatus 22A of the management server 82.

In the system 12A of FIG. 14, the electric vehicle 10A includes the communication control unit 25, and the communication control unit 25 is wirelessly connected to the Internet 81 via the mobile communication network 16. The communication control unit 25 of the electric vehicle 10A transmits and receives data to and from the management server 82 via the Internet 81, through a public communication network (not shown in the drawings).

The management server 82 collects various types of vehicle information (including information concerning each piece of charging equipment 14 connected to each electric vehicle 10A) from a plurality of electric vehicles 10A, via the Internet 81, and accumulates the information in the storage section 40A that is a database.

When the battery 30 of the electric vehicle 10A needs to be charged, the management server 82 notifies the smart device 20 of the owner of the electric vehicle 10A of this fact via the Internet 81. In this case, a text reading "Please charge your car", for example, is displayed in the display section of the smart device 20.

In the system 12 of FIG. 1 as well, when the battery 30 needs to be charged, the smart device 20 and/or the on-board HMI are notified of this fact from the communication control unit 25 via the mobile communication network 16.

In the system 12A of FIG. 14, the storage section 40A, the judging section 42A, and the notifying section 46A are mounted in the management server 82 connected to the Internet 81, and the implementing section 44 is mounted in a navigation apparatus 24A. The implementing section 44 may also be mounted in the management server 82.

The storage section 40A, the judging section 42A, and the notifying section 46A have the same configurations and effects as the storage section 40, the judging section 42, and the notifying section 46 of FIG. 1. The following describes the differing points between the embodiment of FIG. 1 and the second modification of FIG. 14. The storage section 40, the judging section 42, and the notifying section 46 of the electric vehicle 10 shown in FIG. 1 are involved with charging control for only the electric vehicle 10. In contrast to this, the storage section 40A, the judging section 42A, and the notifying section 46A of the management server 82 shown in FIG. 14 are involved with charging control for the plurality of electric vehicles 10A.

The configurations and effects of portions of the storage section 40A, the judging section 42A, and the notifying section 46A of the management server 82 that are involved independently with the battery 30 of each electric vehicle 10A are the same as the effects of the storage section 40, the judging section 42, and the notifying section 46 of the electric vehicle 10 shown in FIG. 1.

In other words, the management server 82 performs the processing of the embodiments and/or first modification described above. The storage section 40A of the management server 82 collects, from the plurality of electric vehicles 10A, a usage history, a charging recommendation threshold value, and the like of each electric vehicle 10A via the Internet 81, and accumulates the usage history, the charging recommendation threshold value, and the like in the management server 82 for each electric vehicle 10A.

The judging section 42A determines usage patterns of the electric vehicle 10A on a per day basis, makes a judgment as to whether charging of the battery 30 is necessary for each individual electric vehicle 10A based on the determined usage patterns, and calculates the charging amount of the battery 30 when charging is necessary.

Information concerning judgment performed by the judging section 42A for each individual electric vehicle 10A as to whether charging of the battery 30 is necessary and concerning the charging amount of the battery 30 calculated when charging is judged to be necessary is transmitted to the implementing section 44 of each electric vehicle 10A via the Internet 81.

The implementing section 44 of each electric vehicle 10A has the same configuration and effect as the implementing section 44 of the electric vehicle 10 in FIG. 1. The differing point is that, while the implementing section 44 of the electric vehicle 10 in FIG. 1 receives the instructions concerning the charging time periods and the charging amounts during these time periods from the judging section 42 in the vehicle without passing through the communication control unit 25. In contrast to this, the implementing section 44 of each electric vehicle 10A whose charging is controlled by the management server 82 receives the instructions concerning the charging time periods and the charging amounts during these charging time periods from the judging section 42A of the management server 82 that is outside the vehicle, via the communication control unit 25.

Upon receiving instructions requesting charging of the battery 30 from the judging section 42A via the Internet 81, the implementing section 44 of each electric vehicle 10A whose charging is controlled by the management server 82 charges the battery 30 up to the remaining capacity (target SOC) indicated by the instructions from the judging section 42A.

[Invention Understandable from the Embodiments and Modifications]

The invention that can be understood from the above-described embodiments and modifications will be described below. The reference numerals used in the above-described embodiments and modifications are affixed to constituent elements to facilitate understanding, but these constituent elements are not limited to those given these reference numerals.

A charging control method for an electric moving body according to the present invention is a charging control method for an electric moving body that moves using a battery 30 as a power source, the charging control method comprising: setting, as a consumption amount of one day, a battery consumption amount from when the electric moving body departs a base charging location 80 to when the electric moving body has returned to the base charging location, and calculating an estimated consumption amount of one day based on the consumption amounts of past n days; setting, as a charging recommendation threshold value, a value obtained by adding the estimated consumption amount and a margin to a lower limit remaining capacity determined in advance; and transmitting a notification prompting charging of the battery to an on-board HMI of the electric moving body or a terminal of a user when a remaining capacity of the battery drops below the charging recommendation threshold value.

In this way, the charging recommendation threshold value is set to be a value obtained by adding, to the lower limit remaining capacity determined in advance, the margin and the estimated consumption amount calculated in advance based on the consumption amounts of a plurality of past days. As a result, the notification prompting charging (charging recommendation notification) is provided at a suitable timing when the remaining capacity has not dropped below the lower limit remaining capacity during vehicle usage, and by performing charging in advance in accordance with this charging recommendation notification, worry about an electricity shortage is eliminated. Furthermore, since the charging recommendation threshold value is limited to the necessary minimum that includes the margin, the number of times charging is performed (charging frequency) is significantly reduced and battery deterioration is restricted. Therefore, it is possible to improve convenience for the user.

In the charging control method for the electric moving body according to the present invention, the estimated consumption amount may be set as a median of the consumption amounts of the past n days; and a value obtained by adding the margin to the estimated consumption amount may be set as a product of the median and m (m is an integer greater than or equal to 1), when a day on which the notification is desired to be received is m days in advance.

As a result, it is possible to set the day (a day m days in advance) on which the notification is desired to be received while also suppressing worry about an electricity shortage, and therefore irritation caused by receiving notifications several days in a row can be eliminated.

In the charging control method for the electric moving body according to the present invention, the estimated consumption amount may be set as a median of the consumption amounts of the past n days; and a value obtained by adding the estimated consumption amount and the margin may be set as a maximum value of the consumption amounts of the past n days excluding outliers, or as a setting value between the maximum value and a third quartile.

As a result, since the value obtained by adding the estimated consumption amount and the margin is set as the maximum value of the consumption amounts of the past n days excluding outliers, or as the setting value between the maximum value and the third quartile, a value larger than the median can be set and the worry about an electricity shortage can be suppressed.

In the charging control method for the electric moving body according to the present invention, a first charging recommendation threshold value and a second charging recommendation threshold value may be set; the first charging recommendation threshold value may be set as a value obtained by adding, to the lower limit remaining capacity, a maximum value of the consumption amounts of the past n days excluding outliers, or a setting value between the maximum value and a third quartile; the second charging recommendation threshold value may be set as a value obtained by adding, to the lower limit remaining capacity, a product of a median of the consumption amounts of the past n days and m (m is an integer greater than or equal to 1), when a day on which the notification is desired to be received is m days in advance; and when the remaining capacity of the battery drops below the first charging recommendation threshold value, the notification may be provided from when the electric moving body returns on a day on which charging is scheduled, and when the remaining capacity of the battery drops below the second charging recommendation threshold value, the notification may be provided from when the electric moving body returns on the day m days in advance.

As a result, since the notification is provided in stages according to the remaining capacity of the battery 30 (from when the electric moving body returns on the day m days in advance when the SOC drops below the second charging recommendation threshold value, and from when the electric moving body returns on the day on which charging is scheduled when the SOC drops below the first charging recommendation threshold value), it is possible to suitably suppress worry about an electricity shortage.

In the charging control method for the electric moving body according to the present invention, a degree of worry about an electricity shortage may be acquired, and the lower limit remaining capacity may be set to a higher value as the degree of worry about the electricity shortage becomes greater.

As a result, suitable notification can be provided according to how the user feels about an electricity shortage.

In the charging control method for the electric moving body according to the present invention, a probability at which the consumption amount of a following day becomes less than or equal to a given consumption amount may be calculated from a probability distribution of the consumption amounts of the past n days, and the estimated consumption amount may be set to a consumption amount causing the probability to become greater than or equal to a prescribed probability.

As a result, by calculating the probability at which the consumption amount of the following day becomes less than or equal to the given consumption amount from the probability distribution of the consumption amounts of n days and setting the estimated consumption amount to the consumption amount causing the probability to become greater than or equal to the prescribed probability, a suitable charging recommendation threshold value can be set according to how the user feels about an electricity shortage.

In the charging control method for the electric moving body according to the present invention, a distribution of the consumption amounts of the past n days may be created, and a consumption amount having a highest probability may be converted into the estimated consumption amount.

As a result, a suitable charging recommendation threshold value with the low probability of an electricity shortage can be set.

In the charging control method for the electric moving body according to the present invention, a scheduled consumption amount from when the electric moving body returns to the base charging location to when the electric moving body departs on a following day may be added to the estimated consumption amount.

As a result, it is possible to set, as the scheduled power consumption, power consumed during a so-called pre-air-conditioning operation time, such as when using a heater or fan in the vehicle before departure, for example.

In the charging control method for the electric moving body according to the present invention, when charging up to a target remaining capacity at a time of departure, if a value obtained by adding a chargeable amount from a time of return to a time of departure to the charging recommendation threshold value is predicted to drop below the target remaining capacity, the charging recommendation threshold value may be adjusted to be higher to enable charging up to the target remaining capacity with the chargeable amount.

As a result, by adjusting the charging recommendation threshold value, it is possible to perform charging up to the target remaining capacity with the chargeable amount.

An electric moving body according to the present invention is an electric moving body that moves using a battery 30 as a power source and comprises a charging control apparatus 22 including a memory that stores a program, and a CPU that reads and executes the program from the memory, wherein the CPU executes the program to cause the charging control apparatus 22 to: set, as a consumption amount of one day, a battery consumption amount from when the electric moving body departs a base charging location 80 to when the electric moving body has returned to the base charging location 80, and calculate an estimated consumption amount of one day based on the consumption amounts of past n days; set, as a charging recommendation threshold value, a value obtained by adding the estimated consumption amount and a margin to a lower limit remaining capacity determined in advance; and transmit a notification prompting charging of the battery 30 to an on-board HMI of the electric moving body or a terminal of a user when a remaining capacity of the battery 30 drops below the charging recommendation threshold value.

As a result, the charging recommendation threshold value is set to be a value obtained by adding, to the lower limit remaining capacity determined in advance, the margin and the estimated consumption amount calculated in advance based on the consumption amounts of a plurality of past days. As a result, the notification prompting charging (charging recommendation notification) is provided at a suitable timing when the remaining capacity has not dropped below the lower limit remaining capacity during vehicle usage, and by performing charging in advance in accordance with this charging recommendation notification, worry about an electricity shortage is eliminated. Furthermore, since the charging recommendation threshold value is limited to the necessary minimum that includes the margin, the number of times charging is performed (charging frequency) is significantly reduced and battery deterioration is restricted. Therefore, it is possible to improve convenience for the user.

The present invention is not limited to the embodiments and the modifications described above, and it is obvious that various configurations can be adopted therein based on the content described in this specification.

What is claimed is:

1. A charging control method for an electric moving body that moves using a battery as a power source, the charging control method comprising:
    setting, as a consumption amount of one day, a battery consumption amount from when the electric moving body departs a base charging location to when the electric moving body has returned to the base charging location, and calculating an estimated consumption amount of one day based on the consumption amounts of past n days;
    setting, as a charging recommendation threshold value, a value obtained by adding the estimated consumption amount and a margin to a lower limit remaining capacity determined in advance;
    transmitting a notification prompting charging of the battery to an on-board human machine interface of the electric moving body or a terminal of a user when a remaining capacity of the battery drops below the charging recommendation threshold value;
    acquiring user feedback regarding whether the user has a worry about an electricity shortage of the battery through the on-board human machine interface or the terminal of the user; and
    changing the lower limit remaining capacity to be higher in a case where the user feedback indicates that the user has the worry and keeping the lower limit remaining capacity unchanged in a case where the user feedback indicates that the user does not have the worry.

2. The charging control method for the electric moving body according to claim 1, wherein:
    the estimated consumption amount is set as a median of the consumption amounts of the past n days; and
    a value obtained by adding the margin to the estimated consumption amount is set as a product of the median and m (m is an integer greater than or equal to 1), when a day on which the notification is desired to be received is m days in advance.

3. The charging control method for the electric moving body according to claim 1, wherein:
    the estimated consumption amount is set as a median of the consumption amounts of the past n days; and
    a value obtained by adding the estimated consumption amount and the margin is set as a maximum value of the consumption amounts of the past n days excluding outliers, or as a setting value between the maximum value and a third quartile.

4. A charging control method for an electric moving body that moves using a battery as a power source, the charging control method comprising:
    setting, as a consumption amount of one day, a battery consumption amount from when the electric moving body departs a base charging location to when the electric moving body has returned to the base charging location, and calculating an estimated consumption amount of one day based on the consumption amounts of past n days;
    setting, as a charging recommendation threshold value, a value obtained by adding the estimated consumption amount and a margin to a lower limit remaining capacity determined in advance; and
    transmitting a notification prompting charging of the battery to an on-board human machine interface of the electric moving body or a terminal of a user when a remaining capacity of the battery drops below the charging recommendation threshold value wherein:
    a first charging recommendation threshold value and a second charging recommendation threshold value are set;
    the first charging recommendation threshold value is set as a value obtained by adding, to the lower limit remaining capacity, a maximum value of the consumption amounts of the past n days excluding outliers, or a setting value between the maximum value and a third quartile;

the second charging recommendation threshold value is set as a value obtained by adding, to the lower limit remaining capacity, a product of a median of the consumption amounts of the past n days and m (m is an integer greater than or equal to 1), when a day on which the notification is desired to be received is m days in advance; and when the remaining capacity of the battery drops below the first charging recommendation threshold value, the notification is provided from when the electric moving body returns on a day on which charging is scheduled, and when the remaining capacity of the battery drops below the second charging recommendation threshold value, the notification is provided from when the electric moving body returns on the day m days in advance.

5. The charging control method for the electric moving body according to claim 1, wherein
a probability at which the consumption amount of a following day becomes less than or equal to a given consumption amount is calculated from a probability distribution of the consumption amounts of the past n days, and the estimated consumption amount is set to a consumption amount causing the probability to become greater than or equal to a prescribed probability.

6. The charging control method for the electric moving body according to claim 1, wherein
a distribution of the consumption amounts of the past n days is created, and then a consumption amount having a highest probability density of the consumption amount of one day according to a kernel density estimation is set as the estimated consumption amount.

7. The charging control method for the electric moving body according to claim 1, wherein
a scheduled consumption amount from when the electric moving body returns to the base charging location to when the electric moving body departs on a following day is added to the estimated consumption amount.

8. The charging control method for the electric moving body according to claim 1, wherein
when charging up to a target remaining capacity at a time of departure, if a value obtained by adding a chargeable amount from a time of return to a time of departure to the charging recommendation threshold value is predicted to drop below the target remaining capacity, the charging recommendation threshold value is adjusted to be higher to enable charging up to the target remaining capacity with the chargeable amount.

9. An electric moving body that moves using a battery as a power source and comprises a charging control apparatus including a memory that stores instructions, and a CPU that reads and executes the instructions from the memory, wherein
the CPU executes the instructions to cause the charging control apparatus to:
set, as a consumption amount of one day, a battery consumption amount from when the electric moving body departs a base charging location to when the electric moving body has returned to the base charging location, and calculate an estimated consumption amount of one day based on the consumption amounts of past n days;
set, as a charging recommendation threshold value, a value obtained by adding the estimated consumption amount and a margin to a lower limit remaining capacity determined in advance;
transmit a notification prompting charging of the battery to an on-board human machine interface of the electric moving body or a terminal of a user when a remaining capacity of the battery drops below the charging recommendation threshold value;
acquire user feedback regarding whether the user has a worry about an electricity shortage of the battery through the on-board human machine interface or the terminal of the user; and
change the lower limit remaining capacity to be higher in a case where the user feedback indicates that the user has the worry and keep the lower limit remaining capacity unchanged in a case where the user feedback indicates that the user does not have the worry.

* * * * *